United States Patent Office
2,887,171
Patented May 19, 1959

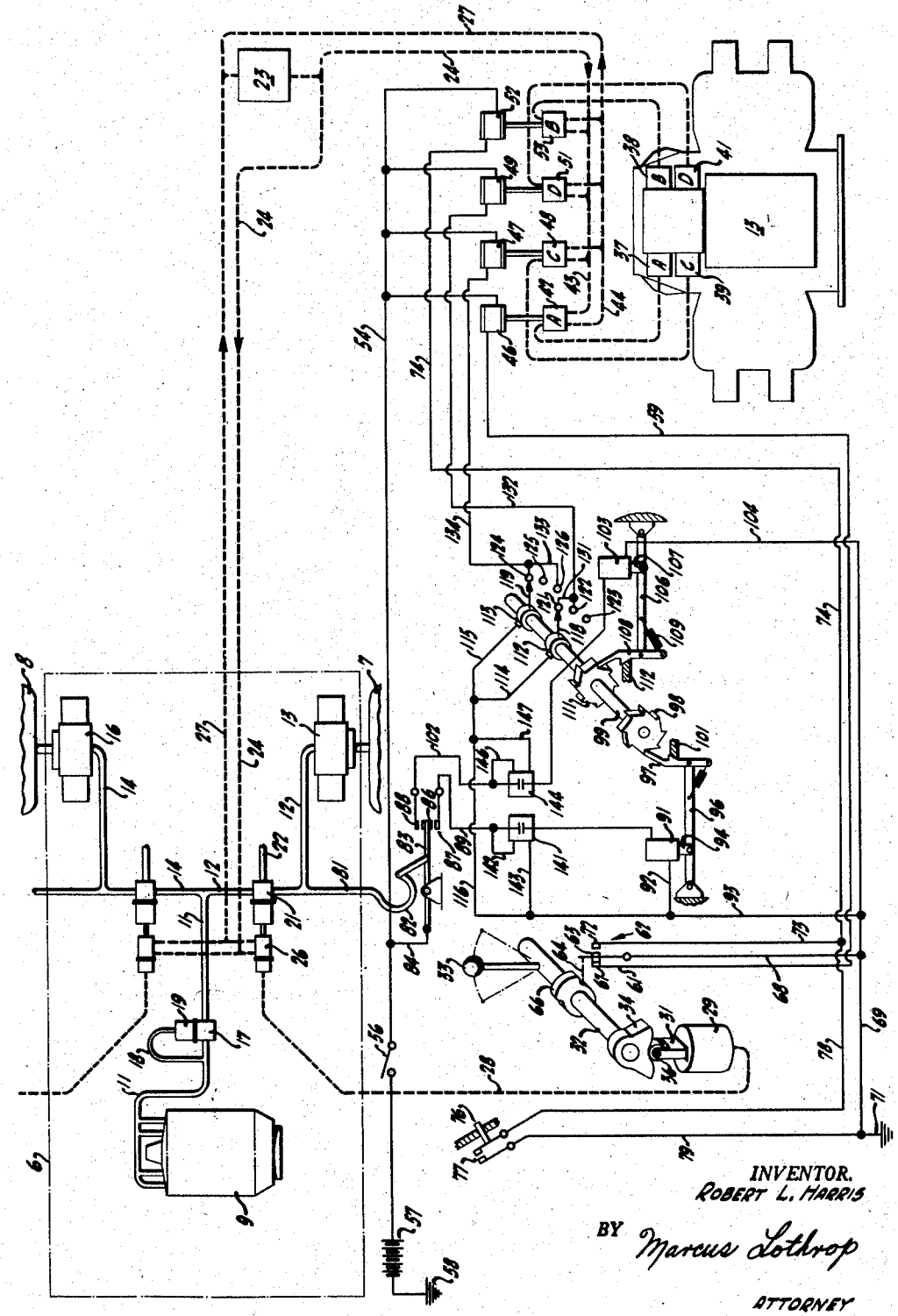

2,887,171
CUT-OFF REGULATING AND STEERING SYSTEM FOR STEAM VEHICLES

Robert L. Harris, Berkeley, Calif., assignor, by mesne assignments, to Yuba Consolidated Industries, Inc., San Francisco, Calif., a corporation of Delaware Application October 18, 1954, Serial No. 462,771

7 Claims. (Cl. 180—6.48)

My invention relates to vehicles propelled by steam engines particularly engines of the reciprocating type having a number of different admission periods, including forward and reverse, which are terminated or cut-off at differently selected times in the engine cycle. While the invention is susceptible to widespread application, it is particularly useful in connection with land vehicles and especially those which are driven by separate engines to each of the ground engaging members. These may be rubber tires, as in the usual case of earth-moving vehicles or can be flexible belt tracks as is the case with crawler tractors and some military vehicles such as tanks.

Steering is accomplished in land vehicles by driving the ground engaging members on opposite sides of the vehicle, either at the same speed for straight-line operation, forward or reverse, or at different speeds for curves of different radii. It is necessary to provide increased driving power to produce the increased speed of the outside track in a turn. To do so requires a distribution of steam such that the outside engine, under most circumstances, receives sufficient additional steam for the additional speed required. In some power plants the steam is supplied by a forced circulation steam generator, a type which characteristically has very little steam or heat storage capacity. It is desirable for this reason, among others, to change the engine admission periods or cut-offs in order, on the one hand, to provide adequate steam for the performance required and, on the other hand, to conserve the steam as much as possible for economy. While continuously variable cut-offs can be provided, it is in some practical instances simpler and more satisfactory to provide a plurality of admission cut-offs in steps; for example, one reverse cut-off at say 60% of the reverse inlet stroke and three forward cut-offs at, say 10%, 22% and 60% of the forward inlet stroke.

An engine having substantially these characteristics and provided with a hydraulic shifting mechanism for affording the desired cut-off positions is shown in Patent 2,690,165 issued on September 28, 1954, to Harris et al., and assigned to the assignee of this application.

It is an object of the invention to provide an improved steering system for steam propelled vehicles.

Another object of the invention is to provide an automatic cut-off regulating mechanism for steam engines.

A still further object of the invention is to provide an automatic steering system under operator control affording appropriate steering maneuvers for a land vehicle and at the same time being economical of steam.

A still further object of the invention is to provide an automatic regulating and steering system for engines of the type shown in the mentioned patent.

Another object of the invention is to provide a quickly and accurately responsive cut-off regulating and steering system for steam vehicles.

Other objects, together with the foregoing, are attained in the embodiment of the invention described in the accompanying description and illustrated in the accompanying drawings, in which:

The figure is a diagrammatic showing of a cut-off regulating and steering system for steam vehicles constructed in accordance with the invention.

As particularly shown in the accompanying drawing, the structure is incorporated in a vehicle 6 having a left-hand ground engaging member 7 and a right-hand ground engaging member 8. In the case of highway or earth moving vehicles, these members are most often pneumatic tires, and in the case of military vehicles, such as tanks, these elements customarily are tracks. Preferably mounted on the vehicle 6 is a source 9 of steam under a selected pressure, for example 2500 p.s.i. and having a selected temperature, for example 1000° F. The details of the steam generating mechanism are not critical, although preferably the generator 9 is of the series tube type which has very little steam storage capacity, but is quickly responsive to its control system.

Steam from the generator 9 is supplied through a conduit 11 to a left branch pipe 12 extending to a left engine 13 directly coupled to the ground engaging member 7 and through the conduit 11 to a right branch pipe 14 extending to a right engine 16 directly coupled to the ground engaging member 8.

Because of the characteristics of the steam supply from the source 9 and the requirements of the engines 13 and 16, there is preferably provided in the conduit 11 a steam regulating valve 17. This valve preferably includes a throttle or flow controlling member regulating the amount of steam passing through the conduit 11 and is preferably responsive to the pressure within the generator 9 or, at least, in the conduit 11 between the valve 17 and the generator 9. For that purpose, a pressure transfer tube 18 extends from the conduit 11 to a responsive cell 19 for regulating the valve 17. If the flow through the conduit 11 becomes great enough to cause a substantial pressure drop, the valve 17 closes correspondingly and limits the flow to an amount compatible with the desired pressure.

Since the vehicle is symmetrical about its longitudinal center line and since the mechanism is, with only one or two minor exceptions, essentially duplicated on the left and right-hand sides the following description of the left-hand structure is intended to apply equally to the right-hand structure. Also to reduce the size of the figure, only the left-hand structure has been fully illustrated, it being understood that the right-hand structure is identical but with reverse symmetry.

Included in the left branch pipe 12 between the conduit 11 and the left engine 13 is a three-way throttle valve 21 having the ability to transmit steam from the branch pipe 12 to the engine 13 in varying amounts from zero to the maximum and also having the ability to isolate the steam supply from the engine 13 and to couple the engine 13 to an exhaust line 22 leading to the atmosphere or to steam condensers. By the operation of the valve 21, therefore, the engine 13 can be supplied with any desired quantity of steam and, further, the engine can be operated at condenser or atmospheric pressure or at any intermediate value of pressure. This is valuable when the engine must be quickly deprived of steam and under conditions when the engine acts as a brake or pump; for example, when the vehicle is descending a grade and the engine is in reverse.

While the valve 21 can be operated by direct manipulation if desired, it is preferably operated indirectly through a hydraulic servo-mechanism. For this and other reasons, a suitable hydraulic pressure set 23 (including the customary storage tank, power driven fluid pump and pressure relief valve) is provided and supplies pressure fluid to a line 24 extending to a left control valve 26. A return or exhaust line 27 extends from the valve 26 back to the pressure set 23. The valve 26 is operated indirectly by a remote control circuit involving a line 28 extending to a cell 29 having a spring returned plunger 31. A control shaft 32 is appropriately mounted and is provided with a control handle 33. The control shaft 32 also has a cam 34 designed to work against a roller 36 on the plunger 31. When the handle 33 is in a neutral or central position as shown in the figure, the roller 36 is in a cam depression and the cell 29 and the valve 26 are positioned so that the servo holds the valve 21 in its central or neutral position.

When the handle 33 is moved to the left in the figure for forward engine and vehicle movement, the cam 34 depresses the plunger 31 and the cell 29 positions the servo valve 26 to open the valve 21, the amount of opening being directly proportional to the amount of deviation of the handle 33 forwardly from its central position. Similarly, when the handle 33 is moved from its central position rearwardly, the cam 34 produces an identical or nearly identical movement of the plunger 31 so that the servo valve 26 similarly moves the valve 22 to a correspondingly open position. With this structure, therefore, the engine 13 is afforded measured or controlled amounts of steam for both forward and reverse operation at varying rates.

Incorporated with the mechanism operated by the left control handle 33 is a mechanism for reversing the engine 13 when the controller moves rearwardly from central or neutral position. This is preferably done by a combination of electrical, mechanical and hydraulic structures. The forward 10% cut-off position for the engine 13 is controlled by a hydraulic cell 37 marked "A" in the drawing and being one of four similar control cells marked "B," "C" and "D," and respectively numbered 38, 39 and 41. To control the A cell 37, there is provided an A valve 42 connected by a manifold 43 to the conduit 24 under hydraulic pressure. The A valve 42 is likewise connected through a manifold 44 to the return line 27 extending to the pressure set 23. Thus, when the A valve 42 is in one extreme position (as it is for all forward driving by the engine 13) the engine cut-off is in its forward 10% position. When the valve 42 is in its other extreme position, the pressure is released from the A cell 37 and other cutoffs can be selected. To operate the A valve 42, a solenoid 46 is employed. This solenoid is one of a group including a solenoid 47 connected to a C valve 48 for the C cell 39, a solenoid 49 connected to a D valve 51 for the D cell 41 and a solenoid 52 connected to a B valve 53 for the B cell 38. All of the solenoids 46, 47, 49 and 52 are connected to an appropriate lead 54 extending through a master control switch 56 to a battery 57 or other suitable source of electrical power preferably having a ground 58.

The solenoid 46 is also provided with a conductor 59 which extends to one member 61 of a switch, generally designated 62, having contacts 63 on an arm 64 movable under the influence of a cam 66 fixed on the shaft 32. The control lever 33 in its central, neutral or mid position is ineffective upon the movable arm 64 which is then spring biased with the contacts 63 in abutment with a contact 67 at the end of the conductor 61. The circuit therefore continues through a conductor 68 extending to a lead 69 connected to a ground 71. A circuit through the A coil 46 is thus completed when the master switch 56 is closed. In sum, in the central or neutral position of the control lever 33, the solenoid 46 is energized and the A valve 42 is then effective to direct hydraulic pressure to the A cell 37 so that the cut-off mechanism of the left engine 13 is shifted into its forward 10% position. When the control lever 33 is moved in a forward direction from central position, the cam 66 remains ineffective upon the switch arm 64 and the engine continues (so far as that control is concerned) in forward 10% cut-off condition.

When the control lever 33 is moved out of the central or neutral position in a rearward direction and the cam 34 begins to open the throttle valve 21, the cam 66 simultaneously or slightly in advance actuates the arm 64, quickly to transfer the movable contacts 63 out of abutment with the contact 67 to break the circuit to the coil 46 so that the A valve 42 releases the pressure from the A cell 37. Continued movement of the contact arm 64 causes the contacts 63 to abut a contact 72 which is therefore grounded. This effect is transferred through a lead 73 and a conductor 74 connected to the solenoid 52. The energized solenoid 52 positions the B valve 53 so that fluid pressure is exerted on the B cell 38. The effect is to shift the engine cut-off mechanism into its reverse cut-off position. Normally, there is only one reverse cut-off at substantially 60% of the engine stroke although if much reverse maneuvering is to be accomplished, there can be a series of reverse cut-off steps comparable to the series of forward cut-off steps. By movement of the lever 33, the direction of motion of the engine is changed between forward and reverse and the amount of displacement of the lever 33 governs the relative amount of steam which is supplied to the engine.

As an adjunct, there is provided a single, manually actuated switch button 76 which is effective when pressed temporarily to close contacts 77 so that a conductor 78 joined to the lead 74 is connected by a wire 79 to ground. When the contacts 77 are closed with the lever 33 in its central position as shown in the figure, both the solenoids 46 and 52 are simultaneously operative. This shifts the valve mechanism into a position in which the engine does not run but in which steam from the branch pipe 12 runs through all of the engine cylinders into the engine exhaust for the purpose of initially warming the engine and discharging any collected water therefrom. When the button 76 is released and the contacts 77 are again opened, the B cell 38 is no longer energized and the engine shifts into forward 10% cut-off due to pressure of the A cell 37 while the lever 33 is in its neutral position.

Means are provided for shifting the engine from the forward 10% cut-off position into a forward 22% cut-off position and into a forward 60% cut-off position and vice-versa, the shifts between the individual positions being automatically effectuated in both directions. These shifts are made in response to the pressure existing within the branch pipe 12. For this reason, connected to the branch pipe 12 is a steam tube 81 terminating in a pressure responsive Bourdon tube 82. A mechanical connection is made to a switch 83 having a lead 84 joined to the conductor 54 and having contact points 86. As the pressure in the branch pipe 12 increases, the Bourdon tube 82 expands and the contacts 86 are lowered to abut a high pressure contact 87. When the pressure within the branch pipe 12 decreases the Bourdon tube 82 contracts and the contacts 86 are brought away from the contact 87 and abut a low pressure contact 88.

The high pressure contact 87 is connected by a lead 89 to a solenoid 91 joined by a wire 92 to a conductor 93 fastened to the ground wire 69. When the contact 87 is energized, the solenoid 91 is effective to operate mechanism constituting a stepping switch, one step for each energization of the solenoid. This mechanism includes an armature 94 of the solenoid 91 which is joined to a lever 96 having a pawl mechanism 97 at one end. The pawl 97 engages a ratchet 98 at one end of a control shaft 99 and advances the ratchet one step as the lever 96 rises upon a steam pressure drop, the contact 87 is de-energized and so is the solenoid coil 91. As the lever 96 falls when the armature 94 is expelled under spring pressure from the de-energized coil 91, the pawl 97 engages the next ratchet tooth. If the ratchet 98 is driven against the pawl 97, the pawl cams against a guide 101 and moves into the next tooth of the ratchet 98.

Somewhat similarly, the low pressure contact 88 is connected by a lead 102 to a solenoid coil 103 having a wire 104 connected to the ground wire 69. A lever 106 is connected to the armature core 107 of the solenoid and is provided with a ratchet lever 108 and an appropriate spring 109. The pawl 108 operates against a ratchet 111 in the same fashion as does the pawl 97 against the ratchet 98 except in a reverse direction of rotation of the shaft 99. A cam guide 112 like the cam guide 101 permits the pawl 108 to disengage when driven by the ratchet 111 so that the shaft 99 may be stepped in opposite directions by the operation of the solenoids 91 and 103, respectively.

On the shaft 99 are slip rings 112 and 113 joined by leads 114 and 115 to a line 116 connected to the conductor 93 and so to ground. Projecting from the shaft 99, in electrical communication with the slip rings 112 and 113 are contact arms 118 and 119, respectively. The arm 118 is selectively engageable with appropriately arranged contact points 121, 122 and 123. Similar contact points 124, 125 and 126 are in position for contact by the arm 119. The points 121 and 122 are connected together by a lead 131 joined to a conductor 132 connected in circuit with the solenoid 49, the contact point 123 being blank. Comparably, the contact points 124 and 126 are joined by a lead 133 connected by a conductor 134 to the solenoid 47, the contact point 125 being blank.

With this wiring arrangement, when the levers 118 and 119 are in abutment with the contacts 121 and 124, respectively, both of the coils 47 and 49 are connected to ground and are therefore energized so that the C cell 39 and the D cell 41 are simultaneously energized. This means that the two cells offset each other and since the A cell is energized through the switch 63, and the B cell is not energized, the engine shifting mechanism is in forward 10% cut-off position.

When the shaft 99 is stepped clock-wise one step by operation of the solenoid 91, then the contact arms 118 and 119 are advanced to abut the contacts 122 and 125. The contact arm 118 continues the energization of the coil 49 which leaves the D cell 41 energized but since the arm 119 is against a blank contact 125, the C cell 39 is not energized. This shifts the valve mechanism into a forward 22% cut-off position. The contacts 63 and 67 are still closed so that the A cell 42 remains energized as in the forward 10% cut-off position, but the engine valves cannot close at the 10% position as the mechanism for the longer, 22% cut-off holds them open until the 22% cut-off position is reached.

When the solenoid 91 is again energized, another step of rotation in the same sense is given to the shaft 99 and the contact arm 18 then moves into abutment with the blank contact 123 and the contact arm 119 moves into abutment with the contact 126. This then interrupts the circuit through the conductor 132 and the coil 49 is de-energized so that the D cell 41 is not active. However, the conductor 133 is energized and energizes the conductor 134 so that the C solenoid 47 makes the C cell 39 effective to shift the mechanism into a forward 60% cut-off position. While the A cell 42 remains energized through the contacts 67 and 63, the longer 60% cut-off takes precedence over the shorter 10% cut-off the same way the 22% cut-off did.

When the solenoid 103 is energized, one counter-clock-wise step of the shaft 99 is produced for each energization so that the contact arms 118 and 119 are moved back in the reverse order, and shifting of the cut-off occurs from forward 60% to forward 22% and then to forward 10%. Shifts back and forth betweeen these positions are effectuated solely in accordance with operation of the solenoids 91 and 103, in turn, depending upon the abutment of the contact 86 with the high pressure contact 87 or the low pressure contact 88.

In order to prevent chatter or too rapid cycling of the step switch structure before the engine 13 has a chance to accommodate itself to any new condition, there is included in the conductor 89 extending to the solenoid 91 a time delay unit 141 connected in the circuit by leads 142 and 143 so that only impulses at a selected interval are effective upon the solenoid 91. A similar time delay unit 144 is included in the conductor 102 extending to the solenoid 103 and is itself joined in the circuit by leads 146 and 147. Thus, the solenoid 103 is made responsive to impulses which arrive only at selected time intervals.

With the main switch 56 closed and the operator manipulating the control lever 33 in a forward direction, the operation of the engine 13 is in forward 10% cut-off, which is the normal situation at relatively high speeds on the level where a small torque is requisite. When the vehicle encounters an increasing grade, the load on the engine 13 increases and the engine slows its speed of rotation. The supply of steam through the branch pipe 12 is substantially unchanged so that the pressure within the branch line increases. This is reflected by a comparable movement of the Bourdon tube 82 and eventually by closure of the circuit through the contact 87. This energizes the solenoid 91 and produces a step rotation of the shaft 94 so that a circuit including the conductor 132 is energized, the D cell 41 is energized and a shift is made into forward 22% cut-off position. The A cell 37 remains energized, but the cut-off is no longer at 10% stroke since the 22% cam, now effective, holds the inlet valve open until 22% stroke. The longer cut-off immediately increases the torque output of the engine with a corresponding drop in steam pressure in the branch pipe 12. If, subsequently, the grade becomes level the speed increases. If the corresponding pressure drop is sufficient, the Bourdon tube 82 contracts and closes the circuit through the contact 88 so that the solenoid 103 gives one step of the shaft 99 in a counter clockwise direction. The circuit through the conductor 132 is maintained and, in addition, a circuit through the conductor 134 is energized so that both the D cell 41 and the C cell 39 are energized to neutralize each other and to restore the engine shifting mechanism to forward 10% cut-off.

On the other hand, if the grade instead of leveling should increase in amount, then the pressure within the branch pipe 12 increases as the engine 13 slows down under the greater load. The Bourdon tube 82 expands rather than contracts and again closes a circuit through the contact 87. This re-energizes the solenoid 91 and the step switch pawl 97 again rotates the shaft 99 from its forward 22% cut-off position into a position in which only the circuit 134 is energized and the circuit 132 is not. That means that besides the A cell 37, that only the C cell 39 is energized and puts the engine shifting mechanism into forward 60% cut-off. Although the 10% cut-off mechanism is still in position, the 60% mechanism holds the inlet valve open for 60% of the inlet stroke. There is an increase in torque. This condition persists until the grade slackens sufficiently so that the engine 13 can speed up permitting the pressure within the branch pipe 12 to drop. Then the Bourdon tube 82 contracts, the contact 88 is abutted, the solenoid 103 is again energized, and a counterclockwise step is imposed on the shaft 99. Since only the conductor 132 is energized, the D cell 41 is the only active one (besides the A cell 37) and the engine then drops back from forward 60% cut-off to forward 22% cut-off. If the condition persists and another actuation is effected by the solenoid 103, then the engine is shifted back to a forward 10% cut-off position. This shifting up and down is done automatically in accordance with the pressure within the branch pipe 12. An exactly similar control regulates the cut-off of the right-hand engine 16 so that the two engines 13 and 16 are always automatically in a cut-off position corresponding to the pressures within the branch pipes 12 and 14 as measured between the controllers 21 and the respective engines.

This is important in the steering of the vehicle since steering has an effect on the ground engaging elements 7 and 8 and on the engines 13 and 16 similar to the increase in grade referred to. That is, the inside ground engaging element, such as the element 7 in a left-hand turn, and its engine 13 slow down and the outside element 8 and its engine 16 speed up. This speed difference is produced by manipulation of the right-hand and left-hand controller 33. In a left turn, the valve 21 is moved toward closed position. The pressure drops and the engine 13 slows down. The respective Bourdon tube 82 causes the step switch to shift the engine cut-off mechanism to short cut-off or holds it there thus permitting substantially the entire steam output of the generator 9 to flow through the branch pipe 14 to the engine 16 on the outside of the curve. If the pressure increase at the right-hand engine 16 in the branch pipe 14 due to the extra load of steam is sufficient to energize its corresponding step switch and if the engine is not already in its long cut-off position, the shifting mechanism is energized to produce automatically a shift into a long cut-off position. The engine, although consuming more steam, delivers more power and thus tends to meet the increased load and maintain the vehicle speed in the curve. Thus without supervision by the operator, there is provided an automatic cut-off shifting mechanism to take care of variations in load caused by grades or by steering or turning of the vehicle. The structure automatically provides appropriate engine cut-off positions for the desired performance.

What is claimed is:

1. A cut-off regulating and steering system for steam vehicles having left and right tracks comprising a left engine for driving said left track, a right engine for driving said right track, each of said engines having at least two cut-off positions, a source of steam under high pressure, a conduit for discharging steam from said source, means for regulating the discharge of steam from said source into said conduit, a pair of branch pipes for conducting steam from said conduit to said respective engines, means in each of said branch pipes for controlling the flow of steam therethrough, means on each of said engines for shifting the cut-off thereof, and means responsive to the pressure in each of said branch pipes for controlling said shifting means on the adjacent one of said engines.

2. A cut-off regulating and steering system for steam vehicles having left and right ground engaging elements comprising a left engine coupled to said left ground engaging element, a right engine coupled to said right ground engaging element, each of said engines having at least two cut-off positions, a source of steam under high pressure, means for individually conducting and regulating a flow of steam from said source to said left engine, means for individually conducting and regulating a flow of steam from said source to said right engine, means responsive to the pressure of the regulated steam flow to said left engine for shifting the cut-off of said left engine, and means responsive to the pressure of the regulated steam flow to said right engine for shifting the cut-off of said right engine.

3. A cut-off regulating system for a steam engine comprising a multi-position step cut-off means for the cylinder inlet valve, means for shifting said cut-off means abruptly between at least two of said step cut-off positions, a source of steam under high pressure, means for conducting steam from said source to said engine, means for regulating the flow of steam from said source into said conducting means, means responsive to pressure in said conducting means between said regulating means and said engine, and means for actuating said shifting means in accordance with the operation of said pressure responsive means.

4. A cut-off regulating system for a steam engine comprising a multi-position step cut-off means for the cylinder inlet valve, means for shifting said cut-off means abruptly between at least two of said step cut-off positions, a source of steam under high pressure, means for conducting steam from said source to said engine, and means responsive to steam pressure in said conducting means for actuating said shifting means.

5. A cut-off regulating system for a steam engine comprising a multi-position step cut-off means for the cylinder inlet valve, means for shifting said cut-off means abruptly between at least two of said step cut-off positions, a source of steam under high pressure, means for conducting steam from said source to said engine, means responsive to the pressure of steam at said source for regulating the flow therefrom into said conducting means, and means responsive to the pressure of the steam in said conducting means between said regulating means and said engine for actuating said shifting means.

6. A cut-off regulating and steering system for steam vehicles having left and right ground engaging elements comprising a left engine coupled to said left ground engaging element, a right engine coupled to said right ground engaging element, each of said engines having at least two cut-off positions, a source of steam under high pressure, a conduit extending from said source, left and right branch pipes extending from said conduit to the adjacent one of said engines, a control valve in said conduit, means for regulating said control valve in accordance with steam pressure at said source, manually regulated valves one in each of said branch pipes, an electric circuit including a left step switch with a left cut-off selector mechanism for said left engine and including a right step switch with a right cut-off selector mechanism for said right engine, a left switch responsive to pressure in said left branch pipe between the regulated valve therein and said left engine and included in said circuit to actuate said left step switch, and a right switch responsive to pressure in said right branch pipe between the regulated valve therein and said right engine and included in said circuit to actuate said right step switch.

7. A cut-off regulating system for a steam engine having at least two cut-off positions, hydraulic devices for shifting said engine between said two positions, electrically operated selector valves for controlling said devices, an electric circuit including said selector valves, a step switch in said circuit for selectively operating said selector valves, means for supplying said engine with steam under pressure, and means responsive to the pressure of said steam for operating said step switch.

References Cited in the file of this patent

UNITED STATES PATENTS

| | | |
|---|---|---|
| 232,739 | Marks | Sept. 28, 1880 |
| 501,959 | Rawlings | July 25, 1893 |
| 779,189 | Thomson | Jan. 3, 1905 |
| 824,425 | Johnson | June 26, 1906 |
| 1,320,845 | Dayton et al. | Nov. 4, 1919 |
| 1,490,056 | Wostenberg | Apr. 8, 1924 |
| 1,750,262 | Frey | Mar. 11, 1930 |
| 1,839,257 | Pfau | Jan. 5, 1932 |
| 1,969,417 | Lentz | Aug. 7, 1934 |
| 2,690,165 | Harris et al. | Sept. 28, 1954 |

FOREIGN PATENTS

| | | |
|---|---|---|
| 57,029 | Austria | Dec. 27, 1912 |